Patented Nov. 21, 1922.

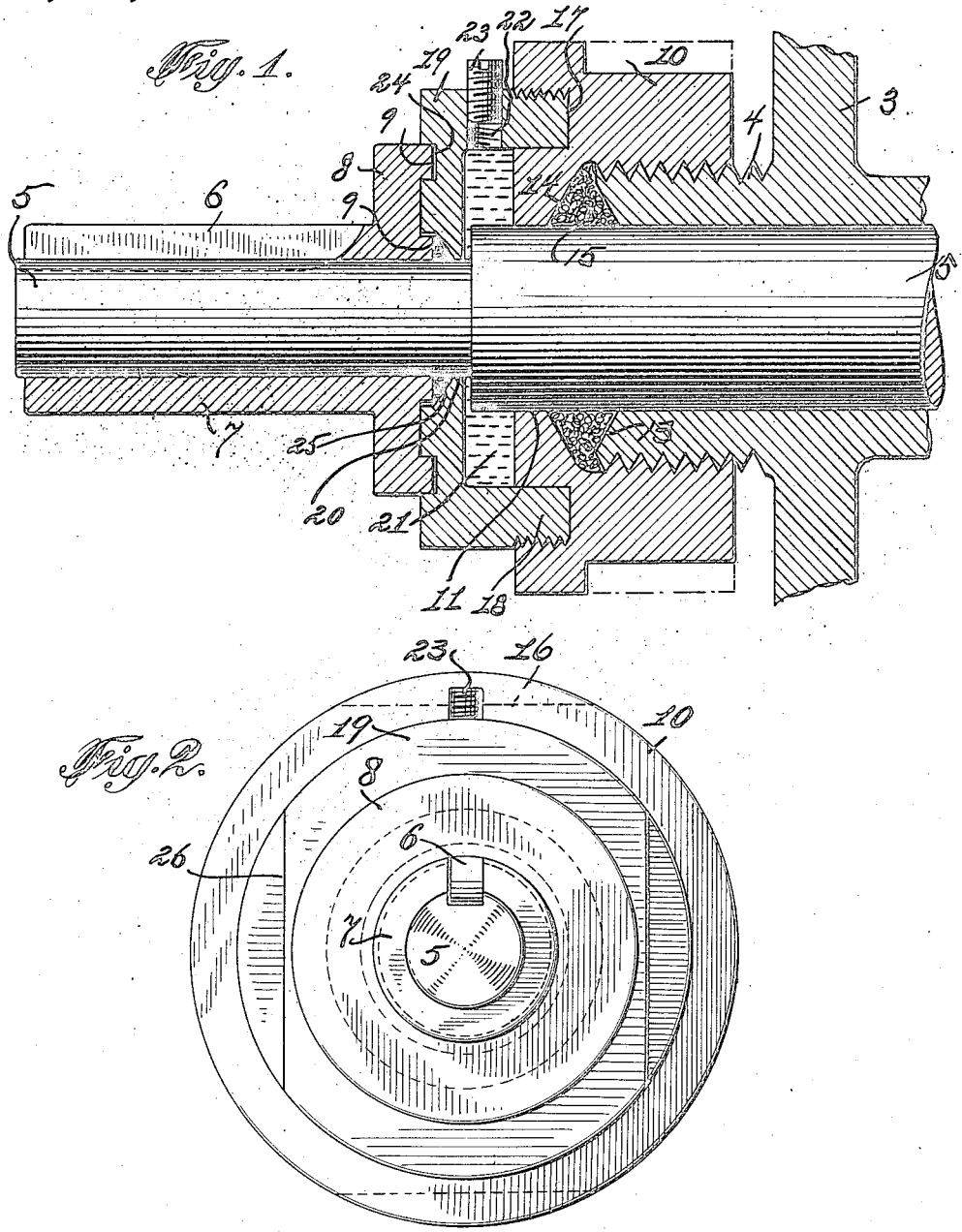
H. E. PELLETIER.
STUFFING BOX FOR PUMPS.
APPLICATION FILED MAR. 2, 1920.
1,435,974. Patented Nov. 21, 1922.
Inventor
Henry E. Pelletier
By his Attorney
Fredk C. Fischer.

1,435,974

UNITED STATES PATENT OFFICE.

HENRY E. PELLETIER, OF NEWARK, NEW JERSEY, ASSIGNOR TO PELLETIER PRODUCTS MFG., CO., INC., OF ELIZABETH, NEW JERSEY, A CORPORATION OF NEW JERSEY.

STUFFING BOX FOR PUMPS.

Application filed March 2, 1920. Serial No. 362,738.

*To all whom it may concern:*

Be it known that I, HENRY E. PELLETIER, a citizen of the United States, residing in the city of Newark, county of Essex, and State of New Jersey, have invented certain new and useful Improvements in Stuffing Boxes for Pumps, of which the following is a full, clear, and exact description, such as will enable others skilled in the art to which it pertains to make, construct, and use the same, reference being had to the accompanying drawings, and to numerals of reference marked thereon, forming a part of this specification.

My present invention aims to provide an improved construction of stuffing-box, and one that can be used in connection with cylinder-heads, pumps and for other purposes in which leakage of fluid around a shaft or stem is to be prevented.

The object of my invention is to improve stuffing-boxes of this general character with a view of maintaining a tight joint around the shaft or stem by a simple, efficient and durable construction, in which neither bolts, springs or washers are employed.

Another object is to provide a construction of this character, wherein the parts are made and arranged in such manner that an oil-well will be provided as a feature of the combination.

A further object of the invention is to provide a construction of this character, which is especially adapted for use in connection with my improved pump and cylinder-head construction for which an application for Letters Patent of the United States was filed on March 2nd, 1920, Serial No. 362,737.

A practical embodiment of the invention is illustrated in the accompanying drawing, in which—

Figure 1 represents a central section through a construction embodying my improvements; and Figure 2 is an end view of the parts shown in Figure 1.

In the embodiment illustrated in the accompanying drawing, 3 represents a fragment of a cylinder or other container for fluid under pressure, and 4 a bearing or packing gland cast therewith. 5 is a revoluble shaft which is operatively engaged in and extends through the bearing 4, and on which, spacedly from the outer end of said bearing, is secured by means of a key 6, a gland 7 having an integral ring-shaped end 8, formed with concentric projections 9, for a purpose presently to appear.

10 is a cylindrical stuffing-box covering provided therethrough with an axial bore, a portion of which at 11 is of a diameter to make intimate fit around the shaft, and the remainder of which is of larger diameter and screw-threaded to co-operate with the screw-threads formed for the purpose on the exterior end of the bearing 4. The end of the bearing 4 is inwardly beveled all around at 13, and the confronting face of the covering 10 is similarly beveled at 14 so as to produce, when these parts are united, an annular chamber of substantially V-shaped form in cross section. Introduced into the chamber thus formed, is a packing 15, of ordinary character. When the packing has been filled in and the shaft applied in position, the covering 10 is screwed home, compressing the packing with a wedging action and forcing it against the shaft to make and maintain a fluid-tight joint.

A portion of the periphery of the covering 10 is made with flattened regions 16 or in a form otherwise non-circular, for the suitable application of a wrench or other tool whereby to turn this part readily.

The outer face of the covering 10 is provided with an annular recess 17, in which is screw-threaded the rim flange 18 of an oil-chamber covering 19, made circular in form and with an axial opening 20, through which the shaft extends. This covering 19 in conjunction with the covering 10, provides an oil chamber 21, which surrounds the shaft; and the oil may be introduced thereinto through an opening 22 kept normally closed by a screw plug 23.

The outer face of the covering 19 is provided with an annular recess 24 corresponding to and receptive of the outer annular projection 9, thereby providing a turning engagement for the gland 7 as it rotates with the shaft 5, the inner concentric projection 9 of the gland 7 bearing against the packing, thereby providing a turning engagement against said packing as it rotates with the shaft 5 to make or maintain a fluid tight joint. Adjacent the shaft, the covering 19 is inwardly beveled at 25 so as to provide, in conjunction with the gland 7, an annular chamber for the reception of metallic or other suitable packing, whereby to make a fluid-tight joint, as in the previous instance. In order conveniently to be turned by a wrench or other tool, the periphery of the covering 19 is made with flattened regions 26.

From the foregoing description, taken in connection with the accompanying drawing, it will be seen that my invention provides improvements which can be readily and advantageously applied in connection with cylinder-heads, pumps, and in a variety of situations where a stuffing-box is required; and it will be noted that the parts are desiged and assembled in such manner that neither bolts, springs or washers, are required, also that the peculiar construction admits of the advantageous employment of an oil-well as an important feature.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claim.

Having thus described my invention, what I claim as new and desire to secure by Letters Patent is:—

In combination, a casing having an outwardly projecting integral screw threaded bearing provided with a beveled end, a shaft provided with a reduced portion extending through the bearing and carrying spacedly therefrom on said reduced portion a keyed gland formed with a disk-shaped head having an annular projection, a packing covering mounted on the shaft between said bearing and gland head and having a portion screw-threaded on the bearing and co-operating with the beveled end thereof to form a packing chamber around the shaft, and an oil-chamber covering mounted on the shaft adjacent said disk-shaped head and provided with a beveled region to form therewith a packing chamber around the shaft and provided further with an annular recess for the reception of the annular projection of said head, said last-mentioned covering being formed with a rim flange having threaded engagement with the packing covering to form with the latter an oil-chamber around the shaft.

This specification signed and witnessed this 25th day of February, 1920.

HENRY E. PELLETIER.

Witnesses:
 FRED'K C. FISCHER,
 FERDENAND T. NOLL.